Patented Aug. 12, 1952

2,606,843

UNITED STATES PATENT OFFICE 2,606,843

PROCESS FOR PRESERVING PLANT AND ANIMAL TISSUES

George R. Fessenden, Baltimore, Md.

No Drawing. Application January 7, 1949, Serial No. 69,840

7 Claims. (Cl. 117—3)

This is a continuation-in-part of my co-pending application for patent, Serial No. 736,105, filed March 20, 1947, now Patent No. 2,567,929, and relates to a method for preserving biological material, both plant and animal, in a manner that provides for enduring retention of the natural appearance, including color and shape, in material which has generally unstable or impermanent appearance characteristics.

Material so preserved is of particular value as museum specimens and is widely useful for educational purposes in the natural sciences and elsewhere. Furthermore, it has unique value for decorative and ornamental use, for product demonstration, display use, and for various other self evident purposes.

The practices heretofore commonly employed for preserving biological material, such as flowers and other plant parts, and zoological specimens, for the purposes enumerated above have given no special attention to the paramount consideration of insuring permanence in the natural appearance of the preserved material in a manner true to the original living specimens, particularly where the color is unstable during processing or subsequently thereto. That is to say, prior practices in preparing and preserving most biological material yield products that only partially fulfill the desired requirements, in that the natural color is not rendered permanent, or it is undesirably altered, or it is replaced by artificial coloring matter, and the preserved material is not adequately protected against deterioration with respect to its appearance.

Accordingly, with a view of avoiding the objections above recited, and solving the various problems incident to the previous shortcomings of the art, a primary object of the present invention is to employ new procedures for preserving biological material, which is commonly subject to change in appearance, in a manner to retain enduringly its natural appearance, including color and shape, and for providing such preserved material with durable and effective protection against deterioration and damage without undesirably altering its natural appearance in so doing.

The foregoing primary object, namely, to prepare biological material so that its natural appearance, including color and shape, is enduringly preserved, is carried out in accordance with this invention by stabilizing the color by chemical treatment and fixing the shape by dehydration, impregnating and/or coating the material thus prepared with a shape-reinforcing substance which is impervious to and/or unaffected by a subsequently applied enveloping medium and which prevents alteration of the natural appearance of the material by such medium, and then protecting the impregnated and/or coated material by surrounding it with a relatively thick mass of transparent, moisture-excluding, durable plastic.

In the preparation of this preserved material, it has been found that biological objects vary to such an extent that different procedures are necessary to preparing the diverse classes of material so that the natural appearance, including color and shape, is not altered through processing and is enduringly retained thereafter under conditions of ordinary use.

Therefore, biological material may, from the point of view of processing, be classified, for convenience, with respect to retention of appearance characteristics, as follows:

Class A comprises material in which the color is naturally unstable and is irreversibly altered by air-drying. This class has been found to include such material as the flowers and leaves of most orchid, gardenia, indianpipe, and mallow species; the flowers of many poppy, verbena, trumpetcreeper, and Camellia species; the leaves of many mint, spurge cactus, Pelargonium and Cinchona species; most of the fleshy fruits and the fleshy fungi; and zoological organisms in general with the exception of the groups noted in the remaining classes.

Class B comprises material in which the color is naturally unstable, but is not irreversibly altered by air-drying. This class has been found to include generally the diverse forms of plant material not specified in the other classes; and such zoological material as the green-pigmented locust, cricket and Mantis species.

Class C comprises material in which the color does not require stabilization but the appearance is subject to alteration by the enveloping medium. This class has been found to include lichens, decayed wood, woody fungi, bark, feathers, and lepidopterous insects.

Class D comprises material in which color and shape are naturally stable and the appearance is not objectionably affected by the enveloping medium. This class comprises matured everlasting flowers such as the everlasting species of the amaranth and the composite families, matured grains and other grasses, cones, nuts and various dried fruits, and most woody or hardened parts of plants not noted in the foregoing class; and it further includes the durably pigmented insects which have rigid integuments, and such other zoological material as teeth, bones, carapaces, shells, horns and claws.

The present invention is primarily concerned with Classes A, B, and C wherein the color of the material must be considered with respect to its stability during processing and subsequently thereto. Material in Class D may be utilized as desired in its natural state, or it may be dehydrated and enveloped in any well known manner without other preparation.

According to the present invention, the processing of biological material so as to preserve enduringly its natural appearance, consists generally of three stages, namely, Stage I—Stabilizing Natural Color and Dehydrating; Stage II—Impregnating; Stage III—Enveloping. Stage I is carried out by procedures employed selectively in accordance with the characteristics of the material being processed, and Stages II and III are carried out by procedures employed selectively in accordance both with the nature of the material being processed and with the use to which the finished product is to be put.

Each of the foregoing stages comprises a number of new and improved steps and procedures which are employed selectively in accordance with the requirements of the classes of material to be processed, and which may be employed in the sequence given or otherwise, and separately or in combination with each other.

The terminology hereinafter used in describing the several actions, substances and materials is to be construed in the light of the following definitions: "material" is intended to mean biological material; "solution" is intended to include dispersions as well as true solutions; "dissolve" is intended to include the dispersion of substances in liquids as well as the forming of true solutions; the term "water-dissolving" as applied to another liquid is intended to mean that the liquid has the property of being able to hold in solution within itself an amount of water equal to at least 5% of the total weight of the solution; the noun "plastic" is intended to apply to resins and other water-resistant substances which are in a polymeric state or capable of being polymerized, and are plastic in that they are capable of being cast, molded, formed, or otherwise shaped by heat and/or pressure; "dehydration" is intended to mean removal of the water content to an extent sufficient to arrest chemical and physical changes which tend to occur when free moisture is present; "impregnation" is intended to mean saturating a permeable material with a substance, leaving a minimum thereof on the surface; the term "enveloping" is intended to mean selectively, coating, encasing, laminating or embedding; the term "conditioning agent" applies to substances employed for the purpose of modifying strength and rigidity characteristics and/or of preventing physical change in appearance factors during processing.

The stages generally described above will now be set forth in greater detail.

STAGE I.—STABILIZING NATURAL COLOR AND DEHYDRATING

In the first stage of preparing biological material in which the natural appearance, including color and shape, are enduringly retained, the material, which may either be fresh or previously dried, is subjected to a chemical preserving treatment which maintains, or re-establishes, the original color and stabilizes it against subsequent change. This chemical treatment consists in subjecting the material to a treating solution comprising a water-dissolving volatile organic liquid containing an oxidation inhibitor and a preserving substance which controls the hydrogen ion concentration and stabilizes the color and composition of the material. With these substances may be further employed selectively, a limited amount of water, a surface-active substance and a conditioning agent. The specific constituents of the solution and the amounts in which they are employed are dependent upon the nature of the particular material to be treated, their selection being determined experimentally in accordance therewith from the classes of substances hereinafter described, their amounts being confined within the limiting ranges specified.

The preservation treatment is followed by dehydration to remove such free water as may have remained in the preserved material, this dehydration being carried out in a manner that provisionally maintains the stabilized color and shape, and prepares the preserved material for impregnating and/or enveloping procedures subsequently to be carried out in Stages II and/or III.

*Stage I.—Procedure 1*

Biological material coming within Class A, i. e., material in which the color is naturally unstable and is irreversibly altered by air-drying, is immersed while still in a fresh condition in a treating solution which consists of suitable constituents hereinafter described dissolved or dispersed in a water-dissolving volatile liquid which is practically free from detrimental effect upon the material when employed in combination with the treating agents specified. The liquids employed for this purpose may be selected from a group which includes monohydric alcohols such as the butyl and the amyl alcohols; ketones, such as acetone, diacetone and methyl-ethyl ketone; esters such as ethyl acetate, ethyl lactate, and triethyl phosphate; and ethers such as dioxane and ethylene glycol monomethyl-ether; and these liquids may be used separately or in combination with each other, or with other liquids which are miscible with them but are not water-dissolving, such as turpentine and the aliphatic and the aromatic hydrocarbons. Both the treating agents and the volatile liquid vehicle in which they are incorporated are employed selectively in accordance with the individual requirements of the material, and the treating agents generally comprise:

(a) Oxidation inhibitors which are employed selectively with respect to the characteristics of the coloring matter in the material to be treated, and are chosen so as to prevent oxidative alteration in its appearance without causing bleaching or other appearance changes that might result from active reducing action exerted upon the natural color matter. For material not generally altered in appearance by reduction, an oxidation inhibitor is used which is selected from the group of salts containing a sulfite radical such as sodium sulfite, or containing a nitrite radical such as sodium nitrite, or containing a phosphite radical such as potassium phosphite; or from a group of quinones such as hydroquinone; or from a group of aldehydes such as formaldehyde; or from a group of oxidizable organic acids such as ascorbic acid; and these substances may be employed separately or in combination with each other or with generally non-reducing anti-oxidants. For material containing anthocyanin pigments or other coloring matter which is altered in appearance by reduction, an oxidation inhibitor selected from the group of generally non-reducing anti-oxidant substances containing a sulfhydryl or an S=C= radical, such as thiourea, is employed in place of a reducing type of oxidation inhibitor. Oxidation inhibitors are employed selectively in amounts ranging from 0.1% to 10% of the total weight of the solution, the optimum being determined in accordance with the requirements of the material undergoing preservation.

(b) The substance used for preservation of the tissue and stabilization of the natural color is an ionizing compound selected from the group including, but not limited to, non-oxidizing acids such as boric, phosphoric, arsenic, citric, tartaric, acetic, and lactic, and the alkali metal and alkaline earth metal, salts of such acids. These compounds are selectively employed singly or in combination with each other or with other similarly constituted compounds, and they are generally used in such proportions as to maintain the pH of the mixture at the value required for retention of the true natural color in the material undergoing preservation. The amounts of these substances or mixtures thereof incorporated in the treating solution range from 0.5% to 10% of the total weight of the solution.

(c) Surface-active substances may be employed in the treating solution in accordance with the requirements of the material being preserved in order to maintain a suitable dispersion of such treating substances as may not be soluble in the liquid medium employed for the treating solution, and/or to obtain a more uniform and rapid response of the material to the various treating substances incorporated in the solution. The substances generally used for this purpose are preferably, but not essentially, of the non-ionizing type and are generally selected from a group of partial esters of polyhydric alcohols with long chain fatty acids, e. g., sorbitan monolaurate, and their polyoxyalkylene esters; and the amounts employed range from 0.1% to 2% of the total weight of the solution.

(d) Conditioning agents may be employed for the purpose of maintaining the opacity of the material and of modifying its rigidity or its flexibility, and of counteracting appearance changes that might otherwise be produced in it by dehydration or by extraction of soluble constituents during treatment. The substances thus used are employed selectively in accordance with the requirements of the material and include liquid organic silicon compounds; high boiling oily liquids such as dibutyl phthalate, butyl phthalyl, butyl glycolate, tributyl citrate, methyl abietate, tributyl phosphate, natural fixed oils such as cottonseed, palm, castor, teaseed, and neatsfoot oil, and drying oils such as linseed, tung, soya and dehydrated castor oil; such waxy substances as beeswax, Chinese wax, Japan wax, carnauba wax, montan wax, ceresin, spermacetti, polyethylene glycol, and paraffin; plastic or resinous substances such as polyvinyl acetate and the polybutyl methacrylates, hydrogenated rosin, hydroabietyl alcohol, hydroabietyl borate, hydroabietyl maleate, hydroabietyl stearate, ester gum, glyceryl phthalate, sucrose octa-acetate; and natural gums and resins such as Canada balsam, shellac, mastic, sandarach, copal, elemi, dammar, rosin, and Venice turpentine. The amount of a conditioning agent employed ranges from 1% to 10% of the total weight of the solution.

(e) A limited amount of water is generally employed in the treating solution in order to increase the ionization of the water-soluble constituents, and to prevent shrinkage or other shape change in the material which might result from too rapid dehydration while undergoing preservation. The amount of water maintained in the solution for these purposes ranges from 1% to 20% of the total weight of the solution and may be regulated through the use of substances which absorb water selectively with respect to the other constituents and which have no adverse effect upon the material being preserved. For this purpose such substances as cellulose fiber and water-soluble cellulose derivatives, agar, gelatin, algin, polyvinyl alcohol, silica gel, anhydrous calcium sulfate, and calcium chloride may be employed selectively and the amount used depends upon the extent to which the water content may require regulation, generally ranging from 5% to 25% of the total weight of the dehydrating liquid.

The material while undergoing treatment is kept submerged in the treating solution for a period ranging from 1 to 24 hours, according to its permeability and the temperature at which it is maintained. During immersion, it is preferable to keep the temperature of the solution between the limits of −5° and +5° C., but acceptable results are obtainable at room temperature or at moderately elevated temperatures. Completion of the preserving action of the solution is generally indicated by the material assuming a more or less uniform translucent appearance as a result of being fully permeated by the solution.

When the material has become adequately preserved, it is subjected to dehydration in order to remove the water remaining in it as a result of the color-stabilizing treatment. Dehydration is carried out according to well known procedure, either by transferring the preserved material from the moisture-containing treating solution into a moisture-free water-dissolving volatile liquid, which may be the same as, or different from, the volatile vehicle employed in the treating solution, and this transfer may be made directly, or through one or several intermediate baths, each of which contains less moisture than the preceding, the final one being practically anhydrous; or by air-drying the preserved material at full atmospheric pressure or at a reduced pressure under conditions where a relative humidity lower than 20% is maintained by employment of desiccant, and/or elevated temperatures within the range tolerated by the appearance factors of the material, and generally not in excess of 75° C. or by removal of moisture by means of low temperature condensing elements. Subsequent to dehydration, and pending impregnation and envelopment by the procedures described for Stages II and III, the material is kept in a practically moisture-free state, either in an anhydrous liquid or in an airtight and preferably desiccated container.

Stage I.—Procedure 2

Biological material coming within Class B, i. e., material in which the color is naturally unstable, but is not irreversibly altered by air-drying, is preferably subjected to preliminary air-drying in such a manner as to maintain the natural color and shape provisionally, either without change, or in a condition that permits of re-establishment by subsequent treatment. This preliminary air-drying is carried out by well known procedures which consist in subjecting the fresh material to air, the relative humidity of which is generally maintained below 20%, either at full atmospheric pressure or at reduced pressure, by means of desiccants such as anhydrous calcium sulfate, calcium chloride, silica gel, concentrated sulfuric acid, or phosphoric anhydride, and/or by means of elevated temperatures, not exceeding 75° C., within the range of tolerance of the appearance factors in the material, and/or by means of refrigerated condensing elements which remove the moisture in the form of frost or ice, or by freezing the material and removing the moisture in it by sublimation under reduced atmospheric pressure.

Material in Class B which is not of sufficiently rigid structure to undergo air-drying without deformation, is supported during dehydration according to well known practice by being surrounded with a non-caking moisture-permeable medium such as sand, silica gel, talc, starch, agar, corn meal, glass beads, granular polymethyl methacrylate, polyvinyl acetate, polystyrene, cellulosic derivatives, flowers of sulfur, boric acid, borax, magnesium citrate, anyhydrous calcium sulfate, or sodium fluosilicate; and these supporting mediums are used selectively and may be employed separately or in combination with each other or with other substances. Dehydration of material packed in such a supporting medium is generally carried out under conditions described in the preceding paragraph which maintain a lower external relative humidity than exists within the supporting medium, and is allowed to proceed for a period of time generally ranging from 1 hour to 3 days according to the nature of the material and the conditions under which dehydration is carried out.

When dehydration has been carried to a degree where practically all free moisture has been removed, the supporting medium is removed from the surface of the dehydrated material, preferably with a feather or a jet of air.

Material which has thus been air-dried is subsequently processed to render its appearance enduringly stable in the manner described in Stage I, Procedure 1, by immersing it while in the dry state in a color-stabilizing preserving solution and finally dehydrating it to remove moisture that may have re-entered it during treatment; and it is then kept in a practically moisture-free state pending impregnating and/or envelopment.

Stage I.—Procedure 3

Biological material coming within Class C, i. e., material in which the color requires no stabilization but the appearance is subject to alteration by the enveloping medium, color-stabilization treatment is omitted and preparation for envelopment is confined to dehydration. Dehydration of material in this class may be carried out in the manner described in Stage I, Procedure 2, or it may be accomplished in accordance with well known practice by immersion in water-dissolving volatile organic liquids such as ethyl alcohol, acetone or dioxane. Subsequent to dehydration the material is kept in a practically moisture-free state pending impregnation and/or envelopment.

STAGE II.—IMPREGNATION

Biological material coming within Classes A, B, and C, which has been preserved and/or dehydrated by the procedures described in Stage I may be impregnated either with a moisture-resistant shape-reinforcing substance which protects it from deterioration and provides it with a substance which is impervious to and/or unaffected by a subsequently applied enveloping medium and which prevents alteration of its natural appearance by such medium when applied.

Stage II.—Procedure 1

Preserved and dehydrated material which has been prepared by the procedures in Stage I, selectively employed, is immersed in a bath of moisture-resistant shape-reinforcing substance, to which a subsequently applied protective coating will adhere securely, dissolved in a suitable moisture-free volatile organic liquid vehicle such as toluene, and which is preferably, but not necessarily, maintained at an elevated temperature not in excess of 100° C.; and the material is kept submerged therein for a period of time ranging from less than 1 minute to 4 hours, dependent upon the nature of the material and the temperature employed, until it is practically completely permeated with the impregnating substance; and this may be done at atmospheric pressure, or under increased pressure or under decreased pressure. The impregnated material is then removed from the bath, and the volatile solvent vehicle which has served as the vehicle for the impregnating substance is allowed to evaporate, preferably in freely moving air which has a relative humidity below 30%, which condition may be maintained by elevation of temperature not in excess of 100° C., and/or by means of commonly employed desiccants.

The impregnating substance employed for this purpose consists of a suitably moisture-resistant and adhesive solid or solidifiable substance selected from a group of waxy substances such as carnauba wax, montan wax, ceresin, microcrystalline paraffin having a melting point of 70° C. or higher, highly chlorinated hydrocarbons, and polyethylene glycol; or drying oils and semi-drying oils such as linseed, tung, soya and dehydrated castor oil, or plastic and resinous substances such as vinyl acetate-chloride copolymer, polyvinyl chloride, polyvinyl acetate, polyvinyl butyral, methyl, ethyl and butyl methacrylate polymers, polyethyl acrylate, polystyrene, hydrogenated rosin, hydroabietyl alcohol, ester gum, glyceryl phthalate, sucrose octa-acetate, aryl sulfonamide-formaldehyde resins, courmarone-indene polymers, polymerized terpene resins, diene polymers and natural rubber, and organic silicon resinous compounds; or natural gums and resins such as rosin, Canada balsam, shellac, mastic, sandarach, copal, elemi and dammar. Substances selected from these groups may be used separately or in combination with each other or with a plasticizer such as dibutyl phthalate, butyl phthalyl butyl glycolate, or tricresyl phosphate, which may desirably modify their toughness and flexibility characteristics; and the amount of the impregnating substance dissolved in the volatile liquid vehicle generally ranges from 5% to 40% of the total weight of the solution, depending upon the substance and the solvent vehicle employed.

Material thus impregnated may be utilized for practical purposes without further processing, or it may be provided with additional protection against deterioration and enhanced in usefulness and attractiveness by being enveloped in a coating or armor, or in a case as set forth in Stage III, Procedures 1 and 2, respectively.

Stage II.—Procedure 2

Preserved and dehydrated material which has been prepared by the procedures described in Stage I, selectively employed, is immersed in a bath of polymerizable moisture-resistant plastic which is in a monomeric or a partially polymerized liquid state and contains from 0.01% to 0.5% of a polymerization catalyst, such as benzoyl peroxide, and the material is kept submerged therein until practically complete permeation has occurred. This is done preferably under reduced atmospheric pressure and at room temperature, and the state of practically complete permeation is generally indicated by the cessation of air bubbles rising from the material. The permeated material is then subjected, in accordance with well known practice, to moderate heat and/or light until the impregnating plastic within it is polymerized to its solid state, which may require from 30 minutes to 10 days, depending upon the nature of the impregnating substance, the kind and amount of catalyst employed and the polymerization-promoting conditions to which it is subjected. The impregnating substance used for this purpose may be selected from the group of polymerizable plastics which includes, but is not limited to, the methyl, ethyl and butyl methacrylates, ethyl acrylate, vinyl acetate, allyl starch, diethylene glycol bis (allylcarbonate), styrene, alkyd-styrene compositions, and phenol-aldehyde, urea-aldehyde and melamine-aldehyde partial condensates; and substances selected from this group may be used singly or in compatible mixtures with each other or with such commonly employed plasticizing agents as dibutyl phthalate, butyl phthalyl butyl glycolate, and tricresyl phosphate. Material thus impregnated may be utilized for practical purposes without further processing, or it may be provided with additional protection against deterioration by being enveloped in accordance with the procedures set forth in Stage III, selectively employed to obtain the type of finished product desired.

Stage II.—Procedure 3

Preserved material which is subject to alteration of natural appearance as a result of contact with a plastic enveloping medium subsequently to be applied, and which is also altered in appearance by contact with a lipophilic substance, may be protected from such appearance alteration by being impregnated with a hydrophilic substance which is unaffected by and impervious to the subsequently applied enveloping medium and which possesses suitable shape-reinforcing properties.

Such protective impregnation is accomplished by immersing the prepared material in an aqueous solution of solidifiable water-soluble gummy substances, such as agar, algin, gelatin, gum acacia, pectin, starch, polyvinyl alcohol, polyethylene glycol, sorbitol borate, sorbitol citrate, sorbitol boriphosphate, glycerol borate, sucrose and hexose sugars, or a solution in a volatile organic liquid such as microcrystalline paraffins, highly chlorinated hydrocarbons, such as paraffin, naphthalene, and diphenyl; and allowing the material to remain submerged at room temperature or at moderately elevated temperature, and preferably under reduced atmospheric pressure, until practically complete permeation has been obtained. The permeated material is then removed and the moisture in it removed by dehydration in the manner described in Stage I, Procedure 1, whereupon it becomes effectively resistant to the appearance-changing action of a subsequently applied plastic enveloping medium. The impregnating substances selected from the above group may be used separately or in compatible combinations with each other or with other substances having similar properties; and the amount of the impregnating substance dissolved in the water ranges generally from 5% to 80% of the total weight of the solution.

STAGE III.—ENVELOPMENT

In the case of biological material in which the true natural color is to be enduringly retained, its successful envelopment in a protective medium has heretofore been restricted to Class D, that is, to material in which both color and shape are naturally stable; whereas, material which is unstable in its appearance has not heretofore been susceptible of envelopment in a manner to retain enduringly its true natural appearance characteristics.

On the other hand, by following the teaching of the present invention, it is possible to envelop material in Classes A, B and C, having unstable appearance characteristics, in a manner that will enduringly retain its appearance characteristics, including color and shape, and this is accomplished by first color-stabilizing and dehydrating the material as in Stage I, and then suitably impregnating it as described in Stage II so as to provide it with a surface which is resistant to the appearance-changing action of a subsequently applied plastic embedding medium. Through employment of these preparatory procedures, it is thus possible to provide the added protection of plastic envelopment to preserved biological material without altering the natural appearance of the material by so doing, and the material in the product thereby obtained has its natural appearance enduringly retained.

Stage III.—Procedure 1

Biological material which comes within Classes A and B, i. e., material which is naturally unstable with respect to color, and which tends to become altered in appearance through contact with an embedding medium subsequently applied, can, after being preserved and dehydrated by selectively employing Stage I—Procedures 1 and 2, and then impregnating with a substance unaffected by and/or impervious to the embedding medium as set forth in Stage II—Procedures 1, 2 or 3, be embedded in a mass of polymerizable transparent durable plastic in a manner to retain its true natural appearance by employing well known practices, as set forth in U. S. Department of Agriculture publication ACE-174, G. R. Fessenden and C. E. Sando, "Embedding Specimens in Methacrylate Resins; A Selected List of References with Annotations," Washington, 1942. In making such embedment, the dehydrated preserved material, after being impregnated in the manner described for Stage II—Procedures 1, 2 or 3, is surrounded with a transparent, polymerizable plastic-forming substance selected from the group including the methyl and ethyl methacrylates, ethylene glycol bis (allylcarbonates), styrene, alkyd-styrene compositions, and other polymerizable polyester compositions; and these are employed in monomeric or partially polymerized fluid form containing a suitable polymerization catalyst, and subsequently solidified while surrounding the material by polymerization effected by moderate heat and/or light in accordance with well known practice.

Stage III.—Procedure 2

Biological material coming within Class C, i. e., material in which the color does not require stabilization, but the appearance is subject to alteration by the enveloping medium, may, after being dehydrated as set forth in Stage I and protectively impregnated by employing selectively Stage II—Procedures 1, 2 or 3, be embedded without alteration of its natural appearance by surrounding it with a mass of fluid polymerizable transparent durable plastic-forming substance containing a polymerization catalyst, and then polymerizing the same to a solid state through use of moderate heat and/or light in the manner set forth under Stage III—Procedure 1. The plastic-forming substance employed for this purpose is selected from the group including the methyl and ethyl methacrylates, ethylene glycol bis (allylcarbonate), styrene, alkyd-styrene compositions, and other polymerizable polyester compositions; and these are employed in monomeric or partially polymerized fluid form containing a suitable polymerization catalyst, and subsequently solidified while surrounding the material by polymerization effected by moderate heat and/or light in accordance with well known practice.

EXAMPLES

The following are representative examples of treating material in accordance with the procedures set forth herein.

*Example 1*

A blue bachelor's-button flower (*Centaurea cyanus*) was packed in anhydrous 22–28 mesh silica gel and maintained for 20 hours at a temperature of 45° C. under a partial vacuum of 29 inches. It was then removed and while still in a dry state was immersed in 500 grams of a solution consisting of ethyl acetate containing 1% boric acid (5 grams), 3% sodium borate (15 grams), 0.5% thiourea (2.5 grams), and 0.1% sorbitan monolaurate polyoxyalkylene partial ester.

It was kept submerged in this solution for 4 hours at room temperature and then freed of the ethyl acetate remaining in it by being exposed to freely moving air having a relative humidity of 20%.

The preserved dehydrated material was then immersed for 2 hours in 500 grams of a solution consisting of toluene containing 20% highly chlorinated naphthalene (100) grams, and 5% polyethyl methacrylate, and maintained at a temperature of 75° C.

Upon removal of the impregnated material from this solution, the toluene remaining in it was eliminated by evaporation in freely moving air having a relative humidity of 25%. The material was then placed on a block of polyethyl methacrylate in a Pyrex glass container and was surrounded with moderately viscous fluid ethyl methacrylate partial polymer containing 0.05% benzoyl peroxide. The container was covered with tinfoil to minimize vapor loss, and then subjected to a partial vacuum of 29 inches for a period of 2 hours in order to remove impounded air from the embedding medium.

The impregnated material surrounded by the embedding medium in the covered container was then maintained at a temperature of 45° C. for 2 days, followed by 55° C. for 2 days and 65° C. for 2 days, by which time the ethyl methacrylate had polymerized to a clear solid enveloping block.

This block was removed from the glass container, and the material in the resulting product was found to have retained its natural appearance, including color and shape, and was resistant to deterioration and damage under natural conditions.

*Example 2*

Two light red rose petals were preserved and dehydrated by the same procedure employed in Example 1 and were then immersed in 100 grams of an aqueous solution containing 40% sodium sorbitol borate (40 grams) having a pH of 4.5, and 0.2% sorbitan monolaurate polyoxyalkylene ester (0.2 gram). The material was kept immersed in this solution for 2 hours at a temperature of 5° C., and was then transferred to a dehydrating bath of butyl alcohol where it was allowed to remain for 30 minutes.

Upon removal from the dehydrating bath, the alcohol was allowed to evaporate in freely moving air having a relative humidity of 15%, and it was embedded by surrounding it with fluid ethyl methacrylate partial polymer containing 0.1% benzoyl peroxide, and then polymerizing the same to a solid state by the procedure employed in Example 1. The material in the resulting product was found to have retained its natural appearance, including color and shape, and was resistant to deterioration and damage under natural conditions.

*Example 3*

A fragment of mold (*Penicillium notatum*) was dehydrated in a closed chamber over anhydrous calcium chloride, and was then immersed in 100 grams of an aqueous solution containing 50% sodium sorbitol borate (50 grams) having a pH value of 6.0, and 10% non-crystallizing sorbitol syrup (10 grams). It was kept submerged in this solution for 10 days at room temperature, and was then removed and dried in air having a relative humidity of 10% maintained at a temperature of 50° C.

This impregnated and dehydrated material was embedded by surrounding it with catalyzed fluid methyl methacrylate partial polymer and then polymerizing the same to a solid state by the procedure employed in Example 1. The material in the resulting product was found to have retained its natural appearance, including color and shape, and was resistant to deterioration and damage under normal conditions.

From the foregoing, it is believed that the invention will be readily understood by those skilled in the art. It is also to be understood that the specimens preserved by the method described and claimed in my co-pending application Serial No. 736,105, filed March 20, 1947, having a thin outer coating applied after impregnation may be embedded in a polymerizable liquid in accordance with the invention described herein, said thin coating serving to protect both the preserved material and the impregnant from any adverse effects of the polymerizable liquid or of any ingredients added thereto, such as catalysts, accelerators, promoters, and so forth, normally used with such embedding substances.

I claim:

1. A process for preserving naturally colored plant and animal tissues, comprising, immersing the tissues in a color stabilizing and preserving solution containing essentially a volatile water-dissolving monohydric alcohol and thiourea, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, then impregnating the tissues with a member selected from the group consisting of polyethylene glycol, glycerol borate, sorbitol boriphosphate, sorbitol borate, sorbitol citrate, sucrose and hexose and then applying to said tissues a substantially transparent moisture-resistant resinous coating.

2. A process for preserving naturally colored plant and animal tissues, comprising, immersing the tissues in a color stabilizing and preserving solution containing essentially a volatile water-dissolving monohydric alcohol and thiourea, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, then impregnating the tissues with polyethylene glycol, and then applying to said tissues a substantially transparent moisture-resistant resinous coating.

3. A process for preserving naturally colored plant and animal tissues, comprising, immersing the tissues in a color stabilizing and preserving solution containing essentially a volatile water-dissolving monohydric alcohol and thiourea, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, then impregnating the tissues with sorbitol boriphosphate, and then applying to said tissues a substantially transparent moisture-resistant resinous coating.

4. A process for preserving naturally colored plant and animal tissues, comprising, immersing the tissues in a color stabilizing and preserving solution containing essentially a volatile water-dissolving monohydric alcohol and thiourea, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, then impregnating the tissues with sorbitol borate, and then applying to said tissues a substantially transparent moisture-resistant resinous coating.

5. A process for preserving naturally colored plant and animal tissues, comprising, immersing the tissues in a color stabilizing and preserving solution containing essentially a volatile water-dissolving monohydric alcohol and thiourea, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, then impregnating the tissues with sorbitol citrate, and then applying to said tissues a substantially transparent moisture-resistant resinous coating.

6. A process for preserving naturally colored plant and animal tissues, comprising, immersing the tissues in a color stabilizing and preserving solution containing essentially a volatile water-dissolving monohydric alcohol and thiourea, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, then impregnating the tissues with glycerol borate, and then applying to said tissues a substantially transparent moisture-resistant resinous coating.

7. A process for preserving naturally colored plant and animal tissues, comprising, immersing the tissues in a color stabilizing and preserving solution containing essentially a volatile water-dissolving monohydric alcohol and thiourea, said solution being adjusted to a pH corresponding substantially to the pH of the liquid medium of the tissues in which the natural coloring matter is suspended, removing the tissues from the solution and permitting the volatile constituents retained in them to evaporate, whereby the natural colors of the tissues are stabilized and their physical shapes are retained, then impregnating the tissues with polyethylene glycol, and then enveloping said tissues in alkyd-styrene copolymer.

GEORGE R. FESSENDEN.

REFERENCES CITED

The following references are of record in the file of this patent:

UNITED STATES PATENTS

| Number | Name | Date |
|---|---|---|
| 547,227 | Pfitzer | Oct. 1, 1895 |
| 1,935,706 | Joffe | Nov. 21, 1933 |
| 1,980,483 | Hill | Nov. 13, 1934 |
| 2,105,688 | Fessenden | Jan. 18, 1938 |
| 2,300,495 | Gerhart | Nov. 3, 1942 |

FOREIGN PATENTS

| Number | Country | Date |
|---|---|---|
| 110,505 | Australia | May 1, 1940 |

OTHER REFERENCES

Preserved in Plastics, Scientific American, vol. 161, No. 4, October 1939, p. 217.